(12) United States Patent
Song et al.

(10) Patent No.: US 10,433,244 B2
(45) Date of Patent: Oct. 1, 2019

(54) INTER-FREQUENCY CELL RESELECTION

(71) Applicant: Verizon Patent and Licensing Inc., Basking Ridge, NJ (US)

(72) Inventors: Lei Song, Fremont, CA (US); Guang Zeng, Lexington, MA (US); Jin Yang, Orinda, CA (US); Nabil N. Bitar, Acton, MA (US); Prema Kumar Yendrapati, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 200 days.

(21) Appl. No.: 14/733,305

(22) Filed: Jun. 8, 2015

(65) Prior Publication Data

US 2016/0295471 A1    Oct. 6, 2016

Related U.S. Application Data

(60) Provisional application No. 62/140,662, filed on Mar. 31, 2015.

(51) Int. Cl.
| | |
|---|---|
| *H04W 36/00* | (2009.01) |
| *H04W 24/02* | (2009.01) |
| *H04W 48/20* | (2009.01) |
| *H04W 48/16* | (2009.01) |
| *H04W 48/18* | (2009.01) |
| *H04W 88/06* | (2009.01) |

(52) U.S. Cl.
CPC ............ *H04W 48/20* (2013.01); *H04W 48/16* (2013.01); *H04W 48/18* (2013.01); *H04W 88/06* (2013.01)

(58) Field of Classification Search
CPC .............................. H04W 36/00; H04W 24/02
See application file for complete search history.

(56) References Cited

U.S. PATENT DOCUMENTS

| | | | | |
|---|---|---|---|---|
| 2004/0116110 A1* | 6/2004 | Amerga | ................ | H04W 48/16 455/422.1 |
| 2013/0109372 A1* | 5/2013 | Ekici | ..................... | H04W 24/02 455/422.1 |
| 2013/0217395 A1* | 8/2013 | Suzuki | .............. | H04W 36/0088 455/437 |
| 2014/0036794 A1* | 2/2014 | Koc | ...................... | H04W 24/04 370/329 |

(Continued)

*Primary Examiner* — Kevin C. Harper
*Assistant Examiner* — Henry Baron

(57) ABSTRACT

A method, a device, and a non-transitory storage medium having instructions to store cell reselection parameters; select a first set of at least one of candidate frequency bands or candidate frequencies based on a first parameter of the cell reselection parameters that indicates candidate frequency bands or candidate frequencies from which can be selected for cell reselection; perform inter-frequency measurement; count a number of inter-frequency measurements performed; determine whether a cell reselection criteria has been satisfied based on one or more signal threshold values; select a new cell in response to a determination that the cell reselection criteria has been met; and determine whether to select a second set of at least one of one or more candidate frequency bands or one or more candidate frequencies indicated by the first parameter in response to a determination that the cell reselection criteria has not been met.

20 Claims, 11 Drawing Sheets

(56) References Cited

U.S. PATENT DOCUMENTS

| | | | | |
|---|---|---|---|---|
| 2014/0057631 A1* | 2/2014 | Zhang | .................. | H04W 48/02 |
| | | | | 455/436 |
| 2016/0020890 A1* | 1/2016 | Sirotkin | ................ | H04W 76/00 |
| | | | | 370/352 |

* cited by examiner

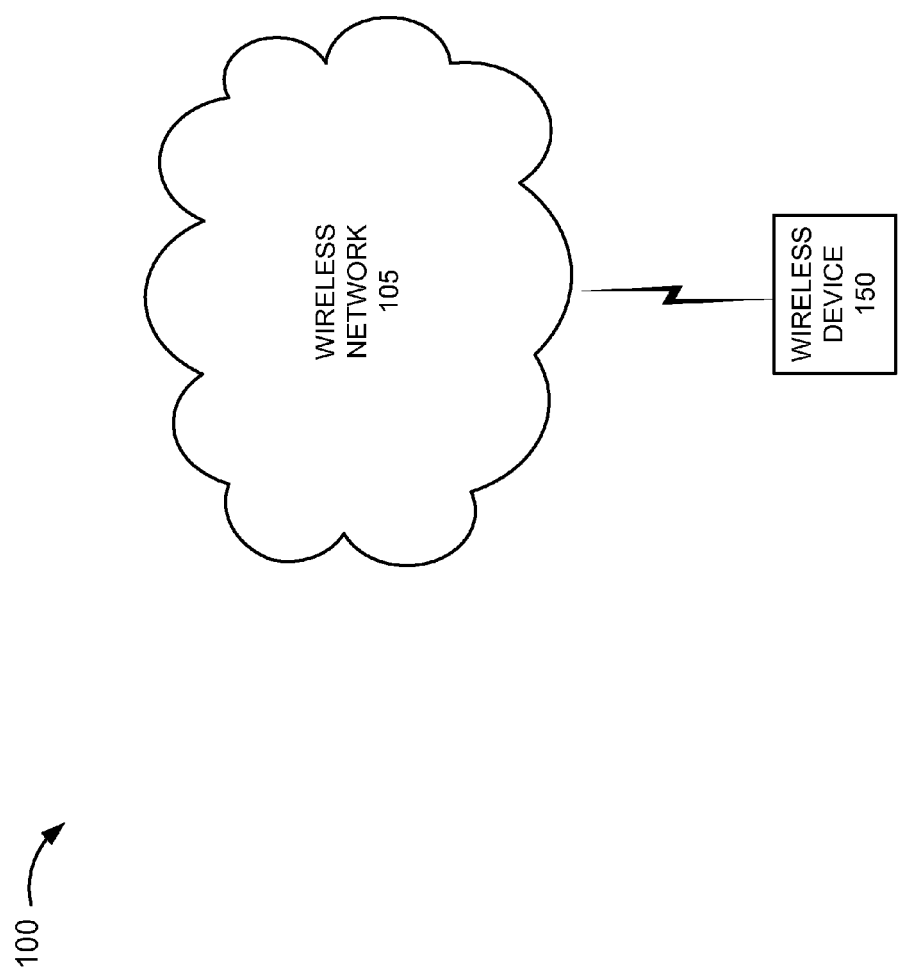

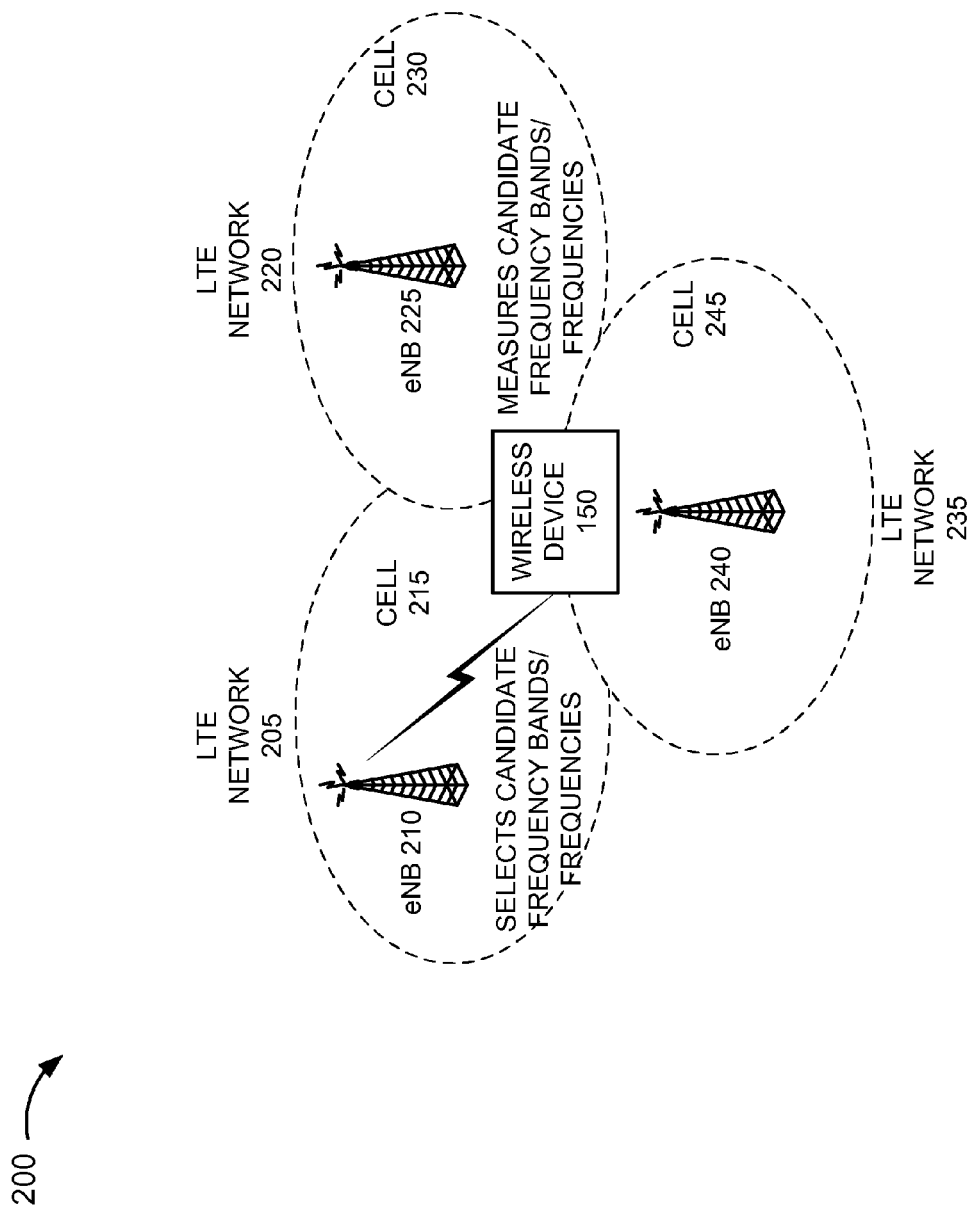

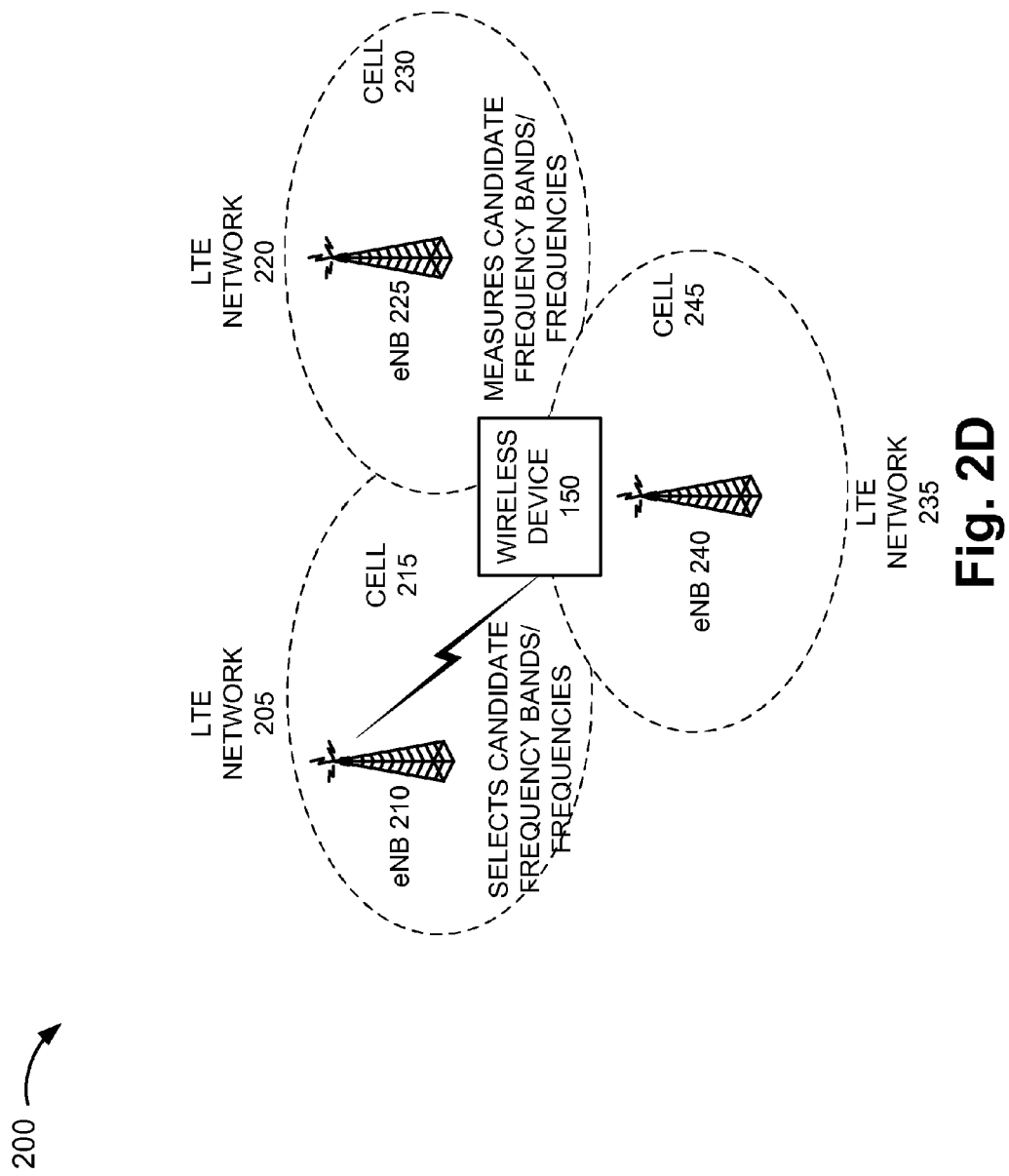

INTER-FREQUENCY CELL RESELECTION

CROSS-REFERENCE TO RELATED APPLICATION

This application claims the benefit of priority based on U.S. Provisional Application No. 62/140,662 filed on Mar. 31, 2015.

BACKGROUND

A wireless communication device (e.g., user equipment (UE), a machine-type device (MTD), etc.) may have a variety of radio access technologies (RATs) available depending on its location, as well as a variety of frequency bands within each RAT. Typically, the wireless communication device is configured to perform various operations during a cell search and selection procedure, which may occur upon initial boot-up, and a subsequent cell search and reselection procedure, after attachment to a wireless network.

BRIEF DESCRIPTION OF THE DRAWINGS

FIG. 1 is a diagram illustrating an exemplary environment in which exemplary embodiments of an inter-frequency cell reselection may be implemented;

FIGS. 2A-2E are diagrams that illustrate an exemplary process pertaining to inter-frequency cell reselection;

DETAILED DESCRIPTION OF PREFERRED EMBODIMENTS

Figure 2A:
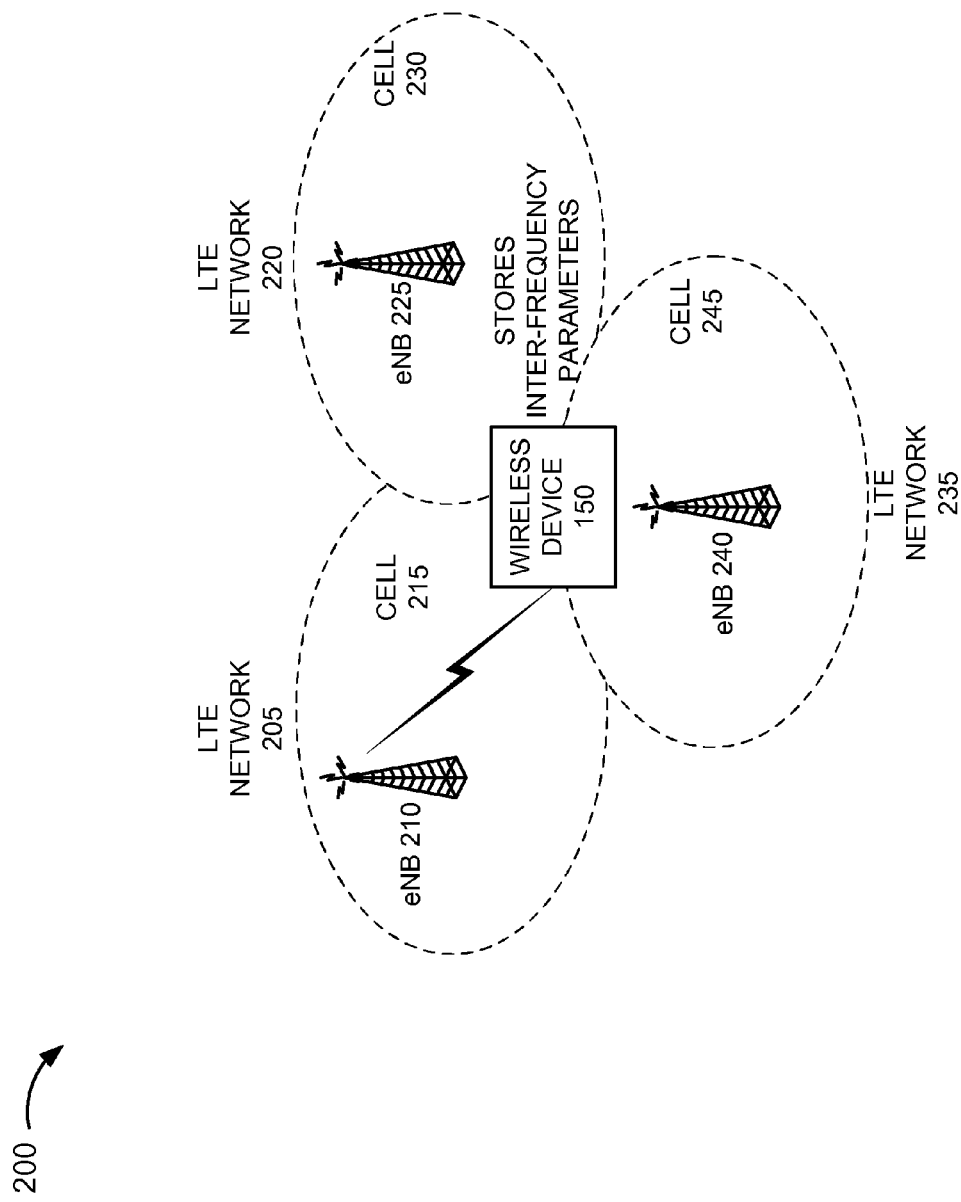

The following detailed description refers to the accompanying drawings. The same reference numbers in different drawings may identify the same or similar elements. Also, the following detailed description does not limit the invention.

A wireless device performs a cell search and reselection procedure based on various parameters. For example, when in idle mode, the wireless device measures the signal strength and/or quality (e.g., Reference Signal Received Power (RSRP), Reference Signal Received Quality (RSRQ)) of the serving cell at least every discontinuous reception (DRX) cycle. The wireless device chooses a set of measurement entities based on selection rules that are configured. For example, if the wireless device has a frequency available to measure with a higher reselection priority than the current frequency, then the wireless device performs inter-frequency measurement for the priority frequency. Conversely, if the wireless device has a frequency with a lower reselection priority than the current frequency, then the wireless device performs inter-frequency measurements for the lower priority frequency when the serving cell quality falls below signal strength and/or quality.

According to one approach, a wireless device, such as a UE in relation to a Long Term Evolution (LTE) network, will perform inter-frequency measurements based on various conditions, such as every DRX cycle, after reselection of another cell, etc. During such a procedure, the UE measures a large set of frequencies within a large set of frequency bands. Additionally, even when the UE is at a location with no inter-frequency handover opportunity, the UE may still constantly perform inter-frequency measurements. As a result, inter-frequency measurement can be power-consuming to the UE based on the frequency at which this procedure is performed, as well as the operations performed within the procedure (e.g., adjusting a radio frequency (RF) chain to tune to a target frequency, cell searching and measurement, etc.).

While power consumption may always be a concern for any device, depending on the wireless device, the availability of power may vary. For example, a machine device may be a low-power, wireless device and/or may be more power-sensitive than another type of wireless device. Additionally, or alternatively, a wireless device may vary in terms of mobility. For example, the machine device may be stationary or have a lower mobility relative to another type of wireless device. In this regard, a "one size fits all" approach regarding cell reselection may not yield the best results for all types of wireless devices.

According to an exemplary embodiment, an inter-frequency cell reselection procedure is provided. According to an exemplary embodiment, the inter-frequency cell reselection procedure uses parameters including a "number of times to measure" (NTM) parameter, a "rest interval" (RI) parameter, a "rest interval after reselection" (RIR) parameter, and a "reselection candidate frequency set" (RCFS) parameter. For purposes of description, these parameters are also referred to as "inter-frequency parameters."

The NTM parameter indicates a maximum number of measurements the wireless device is to perform during every wake-up period. According to an exemplary implementation, the wireless device uses a counter to count the number of measurements so as to adhere to the NTM parameter. According to an exemplary implementation, when the wireless device reaches the maximum number of measurements, the wireless device begins a rest period. The RI parameter indicates a rest period for the wireless device after a cell reselection was not successfully performed. According to an exemplary implementation, the wireless device uses a timer to measure the rest period (e.g., based on some unit of time, such as seconds, minutes, etc.). According to another exemplary implementation, the wireless device measures the rest period based on a DRX cycle.

The RIR parameter indicates a rest period for the wireless device after a cell reselection was successfully performed. According to an exemplary implementation, the wireless device uses a timer or measures the rest period based on a DRX cycle in a manner similar to the "rest interval" parameter. The RCFS parameter indicates one or multiple candidate frequency bands and/or one or multiple frequencies that the wireless device may select from for measurement. For example, the RCFS parameter may indicate a spectrum or one or multiple frequencies within the spectrum. By way of further example, the spectrum may be 1700/2100 megahertz (MHz) (Advanced Wireless Services (AWS)), 1900 MHz (Personal Communication Service (PCS) band), 700 MHz band, an 850 MHz band, etc., or one or multiple frequencies within the AWS band, the PCS band, etc.

According to an exemplary embodiment, the inter-frequency parameters have values relative to each wake-up period and when inter-frequency cell reselection is triggered. For example, assume that the NTM parameter indicates three measurements for each wake-up period of the wireless device. The wireless device will perform no more than three measurements each time the wireless device wakes-up (e.g., from an idle mode, a sleep mode, etc.). According to another exemplary embodiment, the inter-frequency parameters have values relative to a summation of wake-up periods. For example, assume that the NTM parameter indicates nine measurements over a three wake-up cycle interval. The wireless device will perform no more than nine measurements over the three wake-up cycles. In this regard, the wireless device may or may not evenly distribute the measurements over each wake-up period. By way of example, the wireless device may perform three measurements each wake-up period. According to another example, the wireless device may perform two measurements the first wake-up period, three measurements the second wake-up period, and four measurements the third wake-up period. Alternatively, the wireless device may gradually decrease the number of measurements performed over the three wake-up cycles. According to an exemplary embodiment, the wireless device may calculate the appropriate distribution based on the current power level of the wireless device. For example, when the power of the wireless device is below a threshold value, the wireless device may distribute the number of measurements in a decreasing fashion.

According to an exemplary embodiment, the wireless device wakes-up every n-th DRX cycle (e.g., n=1, 2, or 3, etc.) and performs the inter-frequency cell reselection procedure, as described herein, when inter-frequency triggers (e.g., low signal power, quality, etc. of serving cell, expiration of rest period, etc.) exist.

According to an exemplary embodiment, the inter-frequency parameters may be preconfigured on the wireless device. According to another exemplary embodiment, the inter-frequency parameters may be transmitted to the wireless device via network messaging and subsequently stored on the wireless device. For example, the parameters may be transmitted to the wireless device via a communication channel, such as a short data service carried by a Non-Access Stratum (NAS) message.

According to an exemplary embodiment, a parameter has a static value. According to another exemplary embodiment, a parameter has a dynamic value. For example, the value for the RI parameter and/or the value for the RIR parameter may increase (e.g., by a fixed amount, linearly, exponentially, etc.) based on the number of failed attempts to select a cell during cell reselection. According to another exemplary implementation, the RI parameter indicates a longer time period than the RIR parameter. Additionally, or alternatively, when the RIR parameter indicates a shorter time period relative to the RI parameter, the RIR parameter may be increased (e.g., by a fixed amount or exponentially) with each unsuccessful cell reselection until the RIR parameter is of equal value to the RI parameter.

FIG. 1 is a diagram illustrating an exemplary environment 100 in which exemplary embodiments of inter-frequency cell reselection may be implemented. As illustrated, environment 100 includes a wireless network 105. As further illustrated, environment 100 includes a wireless device 150.

Environment 100 may be implemented to include wireless connections between wireless device 150 and wireless networks 105. A connection may be direct or indirect and may involve an intermediary device and/or an intermediary network not illustrated in FIG. 1. Additionally, the number and the arrangement of the connection between wireless device 150 and wireless network 105 are exemplary.

Wireless network 105 includes one or multiple wireless networks of one or multiple types. Wireless network 105 may be implemented using various wireless architectures, standards, and/or technologies. For example, wireless network 105 includes a cellular network, such as a $3^{rd}$ Generation (3G) network, a 3.5G network, a 4G network, etc. By way of further example, wireless network 105 may be implemented to include an LTE network, a Universal Mobile Telecommunications System (UMTS) network, a Global System for Mobile Communications (GSM) network, a Wideband Code Division Multiple Access (WCDMA) network, an Ultra Mobile Broadband (UMB) network, a High-Speed Packet Access (HSPA) network, an Evolution Data Optimized (EV-DO) network, a Worldwide Interoperability for Microwave Access (WiMAX) network, and/or another type of wireless network (e.g., an LTE Advanced network, a future generation wireless network architecture, etc.).

Given the wide variety of wireless networks that may be implemented in various embodiments, wireless network 105 may include various types of network devices, such as a base station, a base station controller, an evolved Node B (eNB), a home eNB, a serving gateway (SGW), a home node B, a wireless relay node, a pico base station, a femto device, a base transceiver station, a repeater, a user device gateway, a radio node, an anchor point, a wireless router, etc. A network device may support one or multiple access and/or wireless technologies. Wireless network 105 may include other types of network devices, such as a network device that pertain to billing, security (e.g., a firewall, etc.), authentication and authorization, network policies, providing a service or an asset, providing access to another network, etc.

Wireless device 150 includes a device with wireless communicative capabilities. Wireless device 150 may be a mobile device. For example, wireless device 150 may be implemented as a smartphone, a tablet device, a netbook, a vehicular communication system within a vehicle, a computer, a wearable device (e.g., a watch, glasses, etc.), a music playing device, a location-aware device, or other mobile, wireless device. Alternatively, wireless device 150 may be a non-mobile (e.g., stationary) device. For example, wireless device 150 may be implemented as a kiosk, a point of sale terminal, a vending machine, a set top box, a smart television, etc. According to an exemplary embodiment, wireless device 150 is implemented as an end user device.

According to another exemplary embodiment, wireless device 150 is implemented as a non-end user or machine type device. By way of example, wireless device 150 may be implemented for wireless, machine-to-machine (M2M) communication, such as a meter device associated with providing a utility service (e.g., gas, electric, etc.), a smart device (e.g., a sensor device, a home security system, a healthcare device, etc.). In this regard, wireless device 150 may operate to provide machine-to-machine communication without an end user. The phrase "machine-to-machine" or "M2M" communication, as used herein, is intended to be broadly interpreted to include communication between two or more devices. Additionally, it is intended that other terms and their meanings, such as, for example, device-to-device (D2D) communication, an Internet of Things (IoT) communication, and/or telemetry are incorporated into the phrase machine-to-machine communication. Given the expansive nature of machine-to-machine communications, this description does not intend to set forth an exhaustive treatment of the various types of wireless, machine-type devices that may be implemented. Notwithstanding, machine-to-machine communications may include communication pertaining to utility metering, security, healthcare, transportation, sensor-related, smart devices, telematics, retail, smart energy, logistics, etc. According to an exemplary embodiment, wireless device 150 is configured to connect to wireless network 105.

An exemplary embodiment of the inter-frequency cell reselection is described further below in relation to FIGS. 2A-2E. FIG. 2A illustrates an exemplary environment 200 in which an exemplary embodiment of inter-frequency cell reselection may be implemented. As illustrated, environment 200 includes an LTE network 205, an LTE network 220, and an LTE network 235. LTE network 205, LTE network 220, and LTE network 235 are an exemplary implementation of wireless network 105. As illustrated, LTE network 205 includes an evolved Node B (eNB) 210, LTE network 220 includes an eNB 225, and LTE network 235 includes an eNB 240. Each of eNB 210, eNB 225, and eNB 240 defines cells 215, 230, and 245, respectively. As further illustrated, environment 200 includes a wireless device 150.

It may be assumed, although not illustrated, that other network elements (e.g., a packet data network gateway (PGW), a serving gateway (SGW), etc.) exist in LTE networks 205, 220, and 235, but have been omitted for purposes of brevity.

Although environment 200 includes multiple networks of specific types (e.g., LTE), according to other embodiments, inter-frequency cell reselection may be implemented in an environment that does not include multiple networks (e.g., a single network available via different frequency bands and/or frequencies) and/or of the same type (e.g., different types of networks, such as LTE and CDMA, LTE and UMTS, etc.). Generally, an embodiment of inter-frequency cell reselection may be implemented in an environment that provides multiple frequency bands and/or frequencies for selection by wireless device 150. For example, an LTE service may be offered via multiple frequency bands (e.g., 700 MHz, 1700 MHz, 1900 MHz, etc.) or another type of network may be accessible via multiple frequency bands. According to another example, multiple networks other than LTE may be available in which each network is offered via different frequency band(s). As previously explained, wireless device 150 may be implemented as a device that does not necessarily require a user (e.g., a wireless, machine-type device, etc.).

According to an exemplary embodiment, wireless device 150 does not perform cell reselection when certain conditions exist. According to an exemplary implementation, wireless device 150 does not perform cell reselection when the signal quality of a serving cell on which wireless device 150 camps satisfies one or multiple threshold values or metrics. According to another exemplary implementation, wireless device 150 does not perform cell reselection while wireless device 150 is in a rest period (e.g., based on the RI parameter or the RIR parameter).

According to an exemplary embodiment, wireless device 150 is pre-configured with the inter-frequency parameters. According to another exemplary embodiment, wireless network 105 (e.g., LTE network 205, LTE network 220, or LTE network 235) transmits the inter-frequency parameters to wireless device 150. Wireless device 150 receives the inter-frequency parameters, stores the inter-frequency parameters, and uses the inter-frequency parameters for cell reselection. For example, the inter-frequency parameters are carried by a NAS message. According to other examples, the inter-frequency parameters may be carried by a message other than the NAS message (e.g., a System Information Block (SIB) message). By way of further example, eNB 210 transmits (e.g., broadcasts, unicasts, multicasts, etc.) the inter-frequency parameters to wireless device 150.

According to this example, assume wireless device 150 is pre-configured with the inter-frequency parameters. For example, a modem, a communication interface, or other component of wireless device 150 may store the inter-frequency parameters. Also assume that LTE network 205, LTE network 220, and LTE network 235 operate within different frequency bands. Referring to FIG. 2A, assume wireless device 150 is attached to and registered with (e.g., camped) LTE network 205 via eNB 210. Thereafter, wireless device 150 enters an idle state (e.g., EPS Connection Management (ECM)-Idle or Radio Resource Control (RRC)-Idle) and subsequently wakes up. Wireless device 150 monitors and measures serving cell 215 metrics or parameters, such as RSRP and RSRQ. Wireless device 150 compares the measured parameters to threshold RSRP and RSRQ values. Based on the comparison, wireless device 150 determines to initiate a cell reselection procedure.

Referring to FIG. 2B, wireless device 150 begins to measure one or multiple frequency bands and/or frequencies within the one or multiple frequency bands. According to an exemplary embodiment, wireless device 150 uses the RCFS parameter to identify one or multiple frequency bands and/or one or multiple frequencies within the one or multiple frequency bands to measure. Additionally, wireless device 150 uses the NTM parameter to manage the number of measurements performed during the cell reselection procedure.

According to an exemplary embodiment, in view of the RCFS and NTM parameters, wireless device 150 uses other criteria pertaining to the selection and measurement of a frequency band and/or a frequency. For example, wireless device 150 selects a candidate frequency band or a candidate frequency indicated by the RCFS parameter instead of another candidate frequency band or another candidate frequency indicated by the RCFS parameter based on a priority system. For example, the priority system may afford a candidate frequency band and/or a candidate frequency a priority over other candidate frequency bands and/or frequencies based on various criteria.

According to an exemplary implementation, the priority system is based on whether the candidate frequency band and/or the candidate frequency pertain(s) to a home wireless network of wireless device 150 versus a visited wireless network. For example, candidate frequency bands and/or candidate frequencies of a home wireless network may be afforded a higher priority than candidate frequency bands and/or candidate frequencies of a visited wireless network.

According to another exemplary implementation, the priority system is based on whether the candidate frequency band and/or the candidate frequency was previously used or selected. For example, a previously used frequency band and/or previously used frequency may be afforded a higher priority than a frequency band and/or a frequency that has not been previously used or has not been previously used within a certain time frame.

According to yet another exemplary implementation, the priority system is based on inter-frequency information. For example, wireless device 150 stores inter-frequency information that may expedite cell reselection. According to an exemplary implementation, the inter-frequency information pertains to a cell search and selection procedure. For example, the inter-frequency information may include a cell identity (e.g., a cell identifier or a physical layer cell identity group and a physical layer identity). Additionally, or alternatively, the inter-frequency information pertains to timing information. For example, the inter-frequency information may include time slot information, sub-frame information, etc. pertaining to primary and/or secondary synchronization signal(s). Wireless device 150 may afford a priority to a cell, a frequency band, and/or a frequency when inter-frequency information is stored pertaining to the cell, the frequency band, and/or the frequency.

According to still another exemplary implementation, the priority system is based on power considerations. For example, wireless device 150 determines a current power state (e.g., available battery power) relative to a threshold power value. When the current power state is equal to or below the threshold power value, wireless device 150 selects the candidate frequency band and/or the candidate frequency that costs less power to switch relative to another candidate frequency band and/or candidate frequency. By way of example, a transition time to switch between a current frequency and another frequency when both frequencies are within a same frequency band may be shorter compared to a transition time between a current frequency and another frequency when the other frequency is within a different frequency band from the current frequency. Additionally, by virtue of the switching time between frequencies of different frequency bands, wireless device 150 may take longer to achieve frequency stability. Based on these considerations, and as a consequence of costing more power, wireless device 150 grants a priority to candidate frequencies within the same frequency band, or frequency bands that are closer relative to the current frequency band compared to other frequency bands that are more distant relative to the current frequency band. According to other exemplary implementations, wireless device 150 may use such a priority system (e.g., pertaining to transition time, etc.) regardless of the current power state of wireless device 150.

Figure 2C:
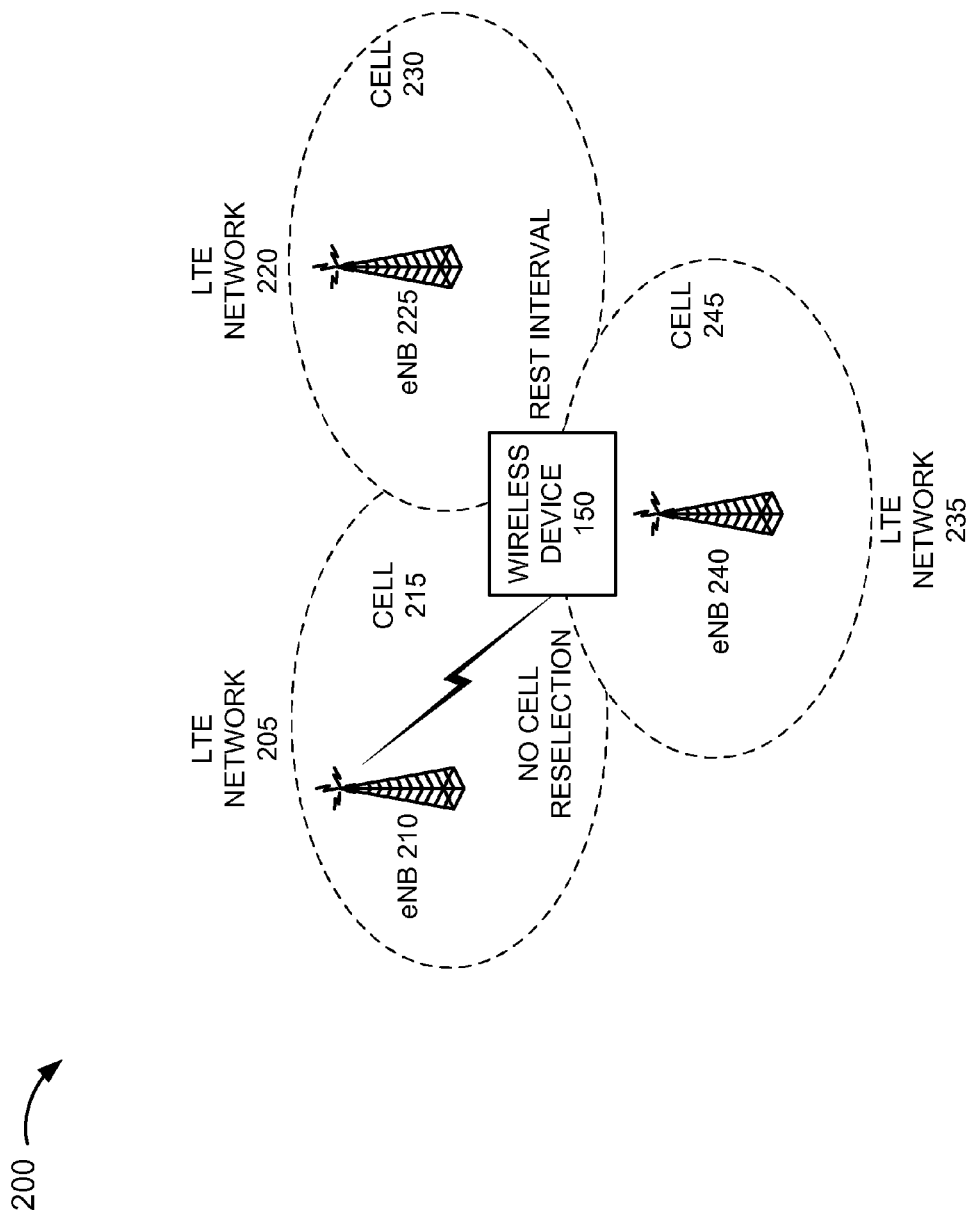

Referring to FIG. 2C, assume that wireless device 150 measures signals based on the RCFS and NTM parameters, as well as the priority system, but such procedure does not result in a cell reselection. Additionally assume that wireless device 150 has measured the maximum number of times permitted based on the NTM parameter. Wireless device 150 uses the RI parameter to determine an amount of time to wait before attempting another cell reselection.

Figure 2E:
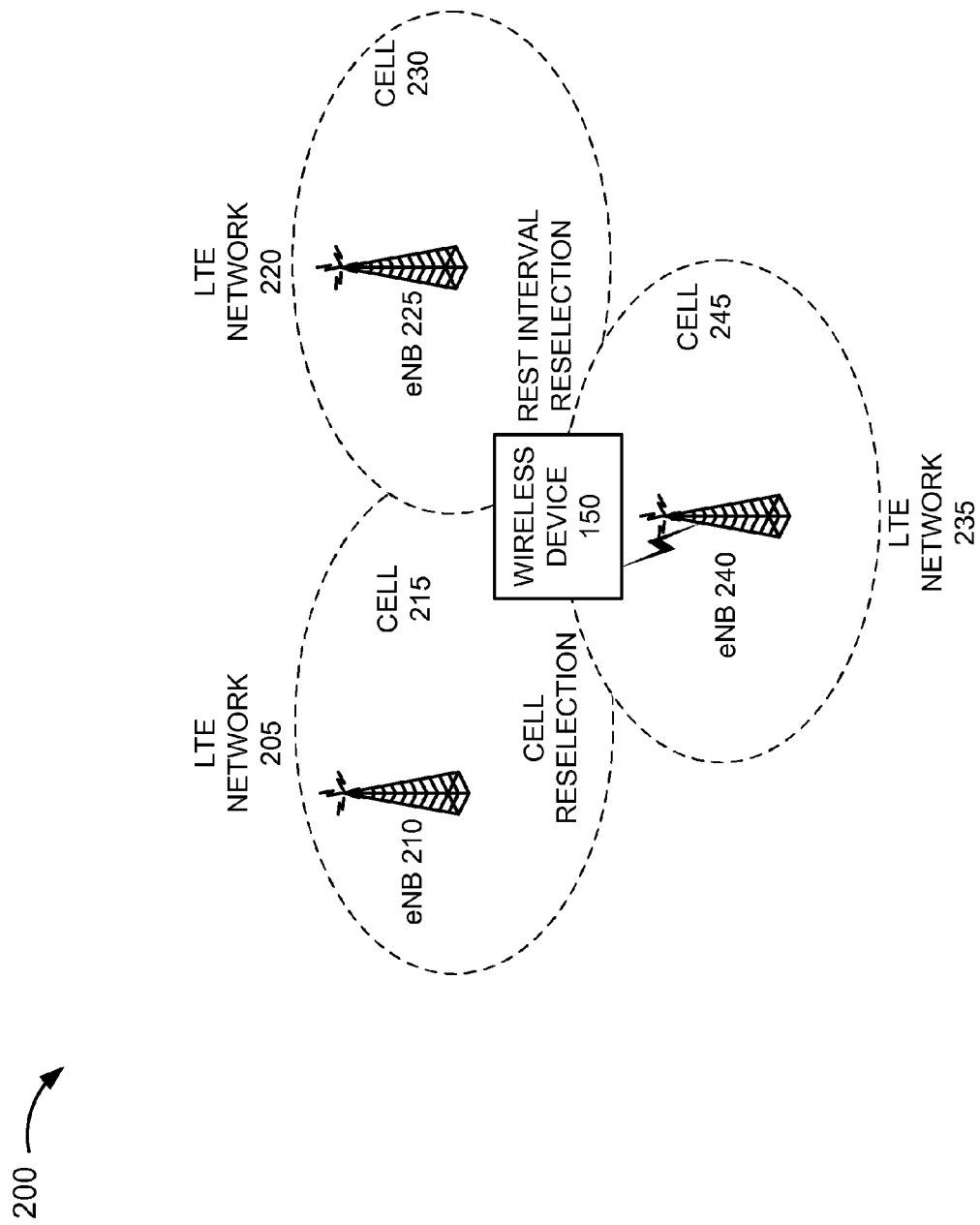

Referring to FIG. 2D, subsequent to the expiration of the rest interval period, wireless device 150 resumes the reselection procedure. According to this exemplary scenario, assume wireless device 150 determines that the signal of serving cell 215 has fallen below threshold levels. Based on this condition, in a manner similar to that previously described in relation to FIG. 2B, wireless device 150 selects one or multiple candidate frequency bands and/or frequencies and begins measuring them. Referring to FIG. 2E, according to this example, assume that wireless device 150 determines, based on the measuring, that a frequency or a frequency band satisfies the criteria for cell reselection. For example, wireless device 150 selects eNB 240 of LTE network 235 and camps on cell 245. Thereafter, wireless device 150 enters a rest period based on the RIR parameter before a next cell reselection procedure is to be attempted.

Figure 2F:
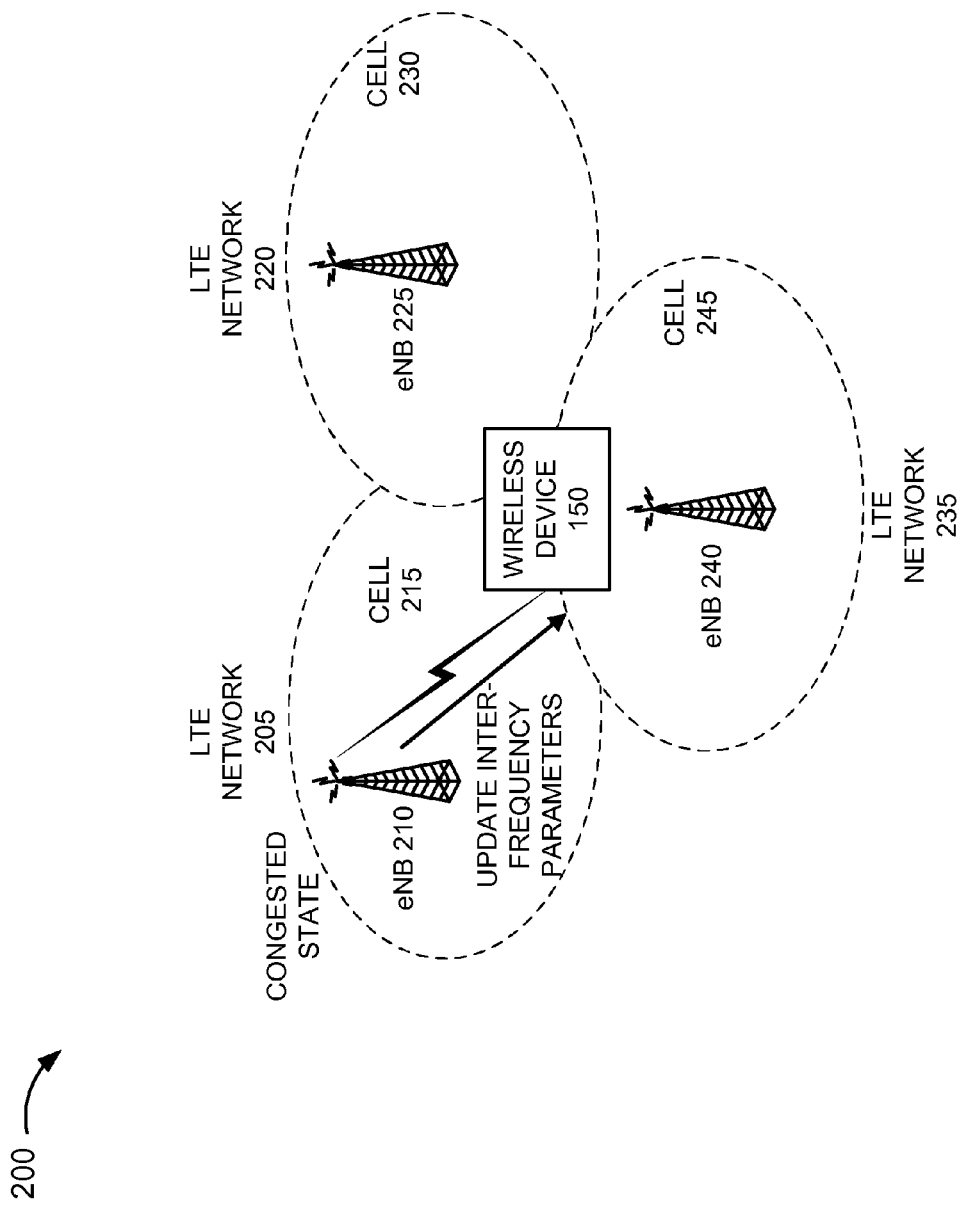
FIGS. 2F and 2G are diagrams that illustrate other exemplary processes pertaining to inter-frequency cell reselection.
Figure 2G:
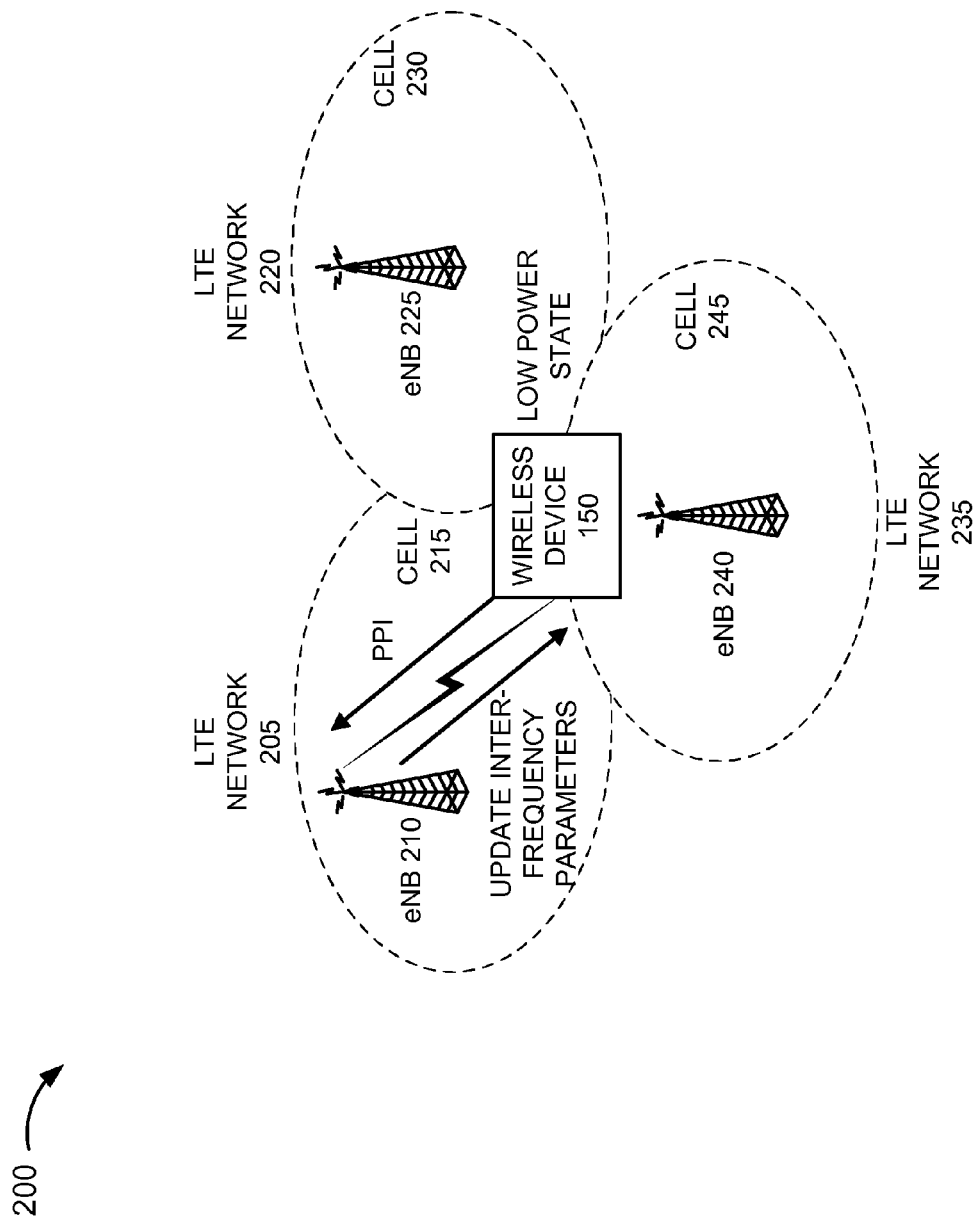

FIGS. 2F and 2G are diagrams that illustrate other exemplary processes pertaining to inter-frequency cell reselection. According to an exemplary embodiment, wireless network 105 transmits an update of inter-frequency parameters to wireless device 150. A triggering event for transmitting the update can be based on the state of wireless network 105 and/or the state of wireless device 150, as described further below.

According to an exemplary implementation, an update to inter-frequency parameters is triggered based on the state of wireless network 105, such as when wireless network 105 is in a near-congested state or a congested state. For example, referring to FIG. 2F, based on the state of LTE network 205, eNB 210 transmits one or multiple updated parameter values pertaining to the inter-frequency parameters. Although not illustrated, when LTE network 205 is no longer in the near-congested state or the congested state, eNB 210 transmits another one or multiple updated parameter values pertaining to the inter-frequency parameters. For example, the values for the one or multiple parameters may be returned to their previous value(s) (e.g., default value(s), normal configuration, etc.).

According to another exemplary implementation, an update to inter-frequency parameters is triggered based on the state of wireless device 150, such as when wireless device 150 is in a low power state (e.g., remaining battery power). For example, referring to FIG. 2G, in response to determining a low power state, wireless device 150 transmits a Power Preference Indicator (PPI) to eNB 210 of LTE network 205. In response to receiving the PPI, eNB 210 transmits the update of one or multiple parameter values pertaining to the inter-frequency parameters. Although not illustrated, when wireless device 150 is no longer in a low power state, wireless 150 transmits another PPI, which indicates that wireless device 150 is no longer in a low power state (e.g., PPI indicates wireless device 150 is in a normal power state). In response to receiving the PPI, eNB 210 transmits another update of the one or multiple parameter values pertaining to the inter-frequency parameters. For example, the values of the one or multiple parameters may be returned to their previous value(s) (e.g., default value(s), normal configuration, etc.).

According to an exemplary implementation, the update to inter-frequency parameters may include that the NTM parameter value is reduced so that wireless device 150 performs a fewer number of measurements. Additionally, or alternatively, the RI parameter and/or the RIR parameter value(s) may be increased to indicate a longer rest time period. Additionally, or alternatively, the RCFS parameter value may indicate a smaller set of candidate frequency bands and/or candidate frequencies, or indicate a particular candidate frequency band and/or candidate frequency to be measured and/or used by wireless device 150 when a cell reselection procedure is initiated.

According to another exemplary implementation, the triggering of cell reselection criteria may be updated. For example, the signal power threshold value and/or the signal quality threshold value may be reduced to further minimize the likelihood for triggering cell reselection. Additionally, or alternatively, the number of DRX cycles used by the wireless device 150 as a time referent may be increased, which may reduce the frequency at which wireless device 150 wakes up.

Figure 3:
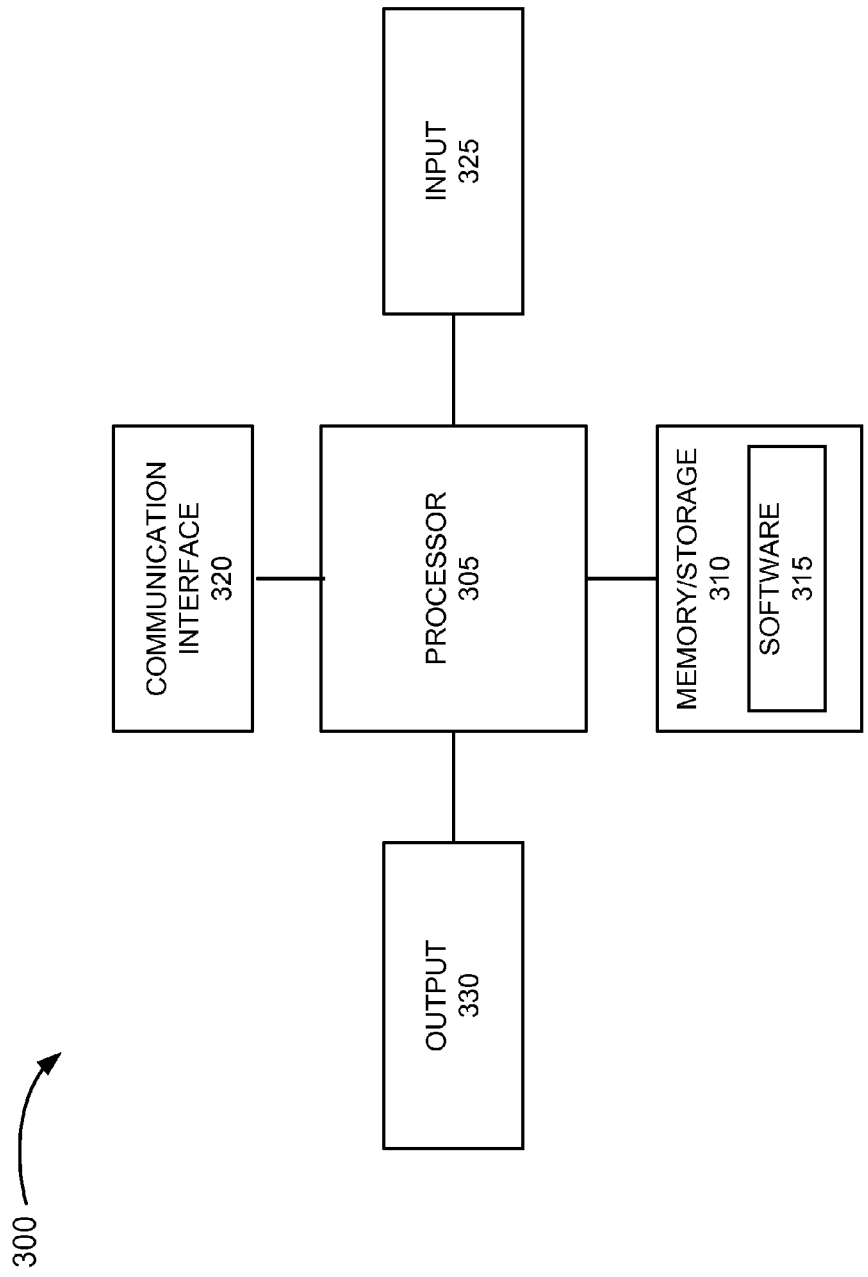
FIG. 3 is a diagram illustrating exemplary components of a device that may correspond to one or more of the devices in the exemplary environment.

FIG. 3 is a diagram illustrating exemplary components of a device 300 that may correspond to one or more of the devices in the environments described herein. For example, device 300 may correspond to network devices of wireless network 105 and wireless device 150. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to wireless device 150, software 315 may include an application that, when executed by processor 305, provides the functions as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard. Wireless device 150 may include multiple communication interfaces 320. For example, the multiple communication interfaces 320 support multiple wireless technologies.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4A:
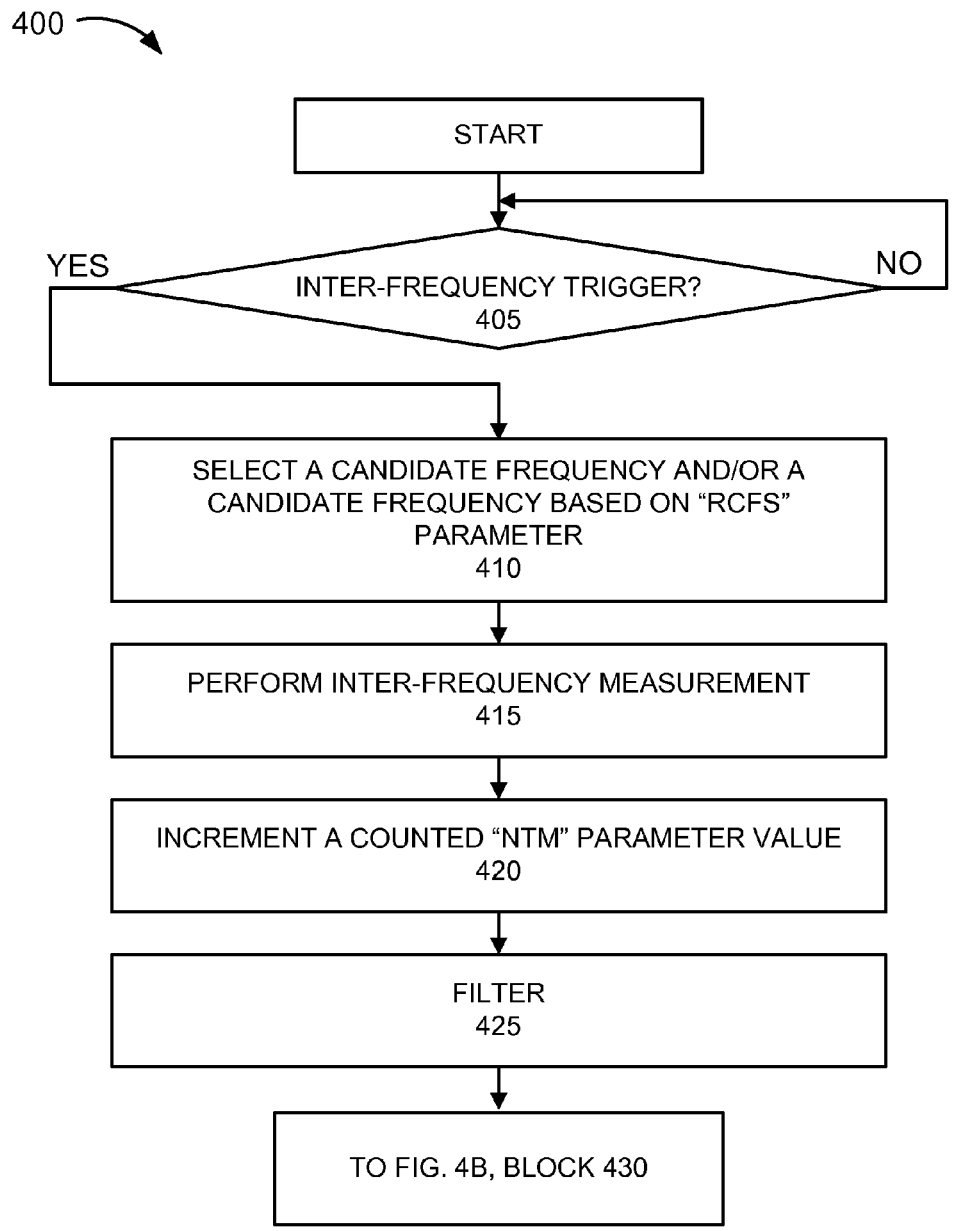
FIGS. 4A and 4B are flow diagrams that illustrate an exemplary process pertaining to inter-frequency cell reselection.
Figure 4B:
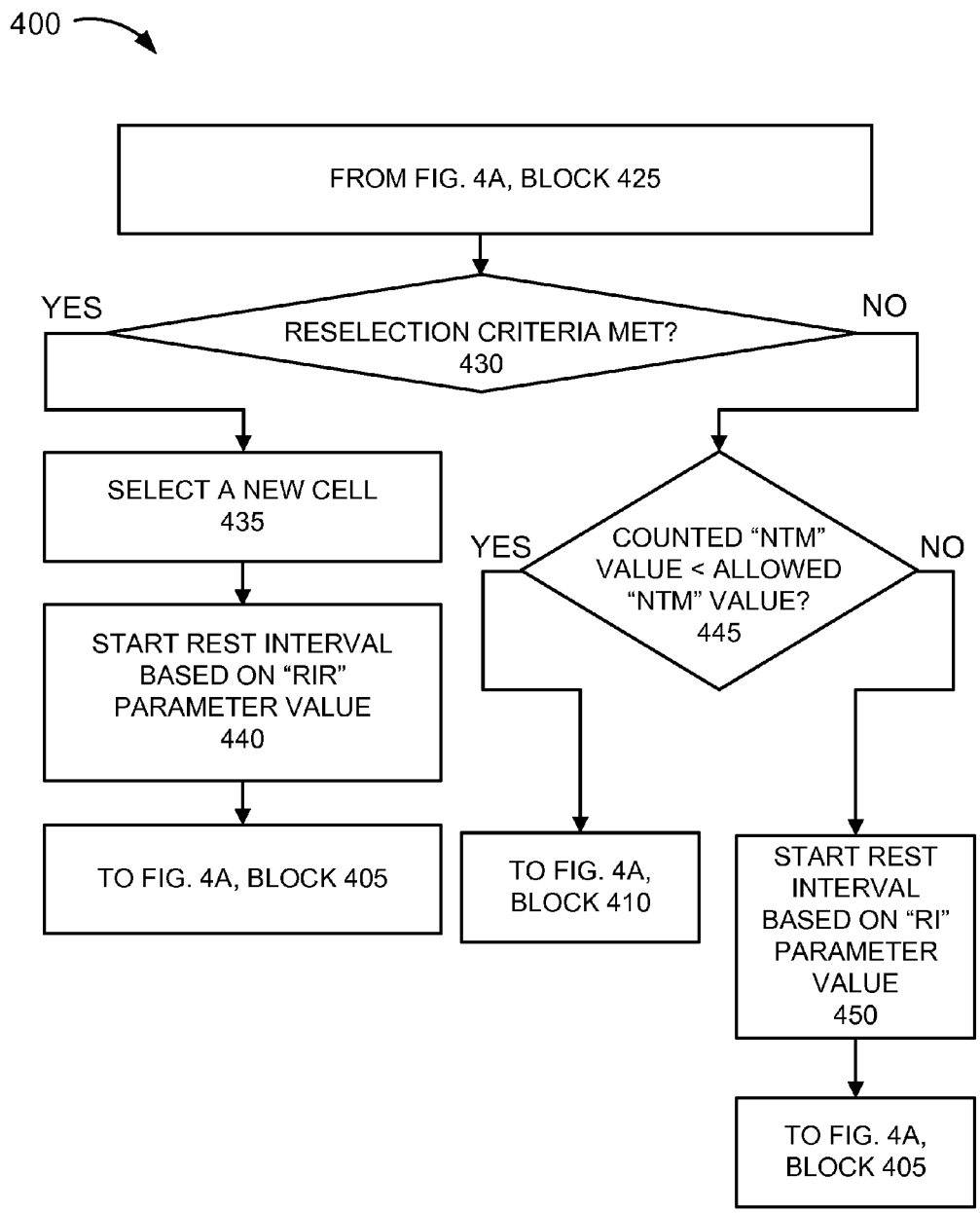

FIGS. 4A and 4B are flow diagrams that illustrate an exemplary process pertaining to inter-frequency cell reselection. Process 400 is directed to a process previously described above with respect to FIGS. 2A-2E and elsewhere in this description, in which a cell reselection procedure based on inter-frequency parameters is provided. According to an exemplary embodiment, wireless device 150 performs the steps described in process 400. For example, processor 305 may execute software 315 to perform the steps described. As previously described, wireless device 150 may not perform a cell reselection procedure when one or multiple serving cell metrics signal power, signal quality, etc.) are acceptable. Additionally, or alternatively, wireless device 150 may not perform a cell reselection procedure during a rest interval associated with the RI parameter and the RIR parameter. Conversely, as previously described, wireless device 150 may perform process 400 when one or multiple cell metrics are unacceptable (e.g., fall below particular thresholds) and/or after a rest interval has expired.

Referring to FIG. 4A, process 400 may begin with determining whether an inter-frequency trigger exists (block 405). For example, wireless device 150 determines whether to initiate a cell reselection procedure. According to an exemplary implementation, wireless device 150 performs signal measurement pertaining to the current serving cell. For example, wireless device 150 stores threshold values pertaining to signal power and/or signal quality, which are used to determine whether to initiate the cell reselection procedure. When the signal of the serving cell falls below the threshold values, wireless device 150 determines that an inter-frequency trigger exists. According to an exemplary implementation, wireless device 150 measures the signal of the serving cell only when wireless device 150 is not within a rest interval period. According to another exemplary implementation, wireless device 150 measures the signal of the serving cell regardless of whether wireless device 150 is within or not within a rest interval period. In this regard, a trade-off may exist between waiting until the rest interval expires to preserve power even when the signal from the serving cell may fall below the threshold values and perhaps sacrificing performance versus consuming power by measuring the signal from the cell during a rest interval for the sake of maximizing performance.

In block 410, a candidate frequency band and/or a candidate frequency is selected based on the RCFS parameter. For example, wireless device 150 selects one or multiple frequency bands and/or one or multiple frequencies within the one or multiple frequency bands to measure based on the RCFS parameter. According to an exemplary implementation, wireless device 150 selects one or multiple frequency bands and/or one or multiple frequencies within the one or multiple frequency bands based on one or multiple priorities, as previously described.

In block 415, inter-frequency measurement is performed. For example, wireless device 150 measures the RSRP and the RSRQ pertaining to the selected one or multiple frequency bands and/or one or multiple frequencies within one or multiple frequency bands.

In block 420, a counted NTM parameter value is incremented. For example, wireless device 150 uses a counter to count the number of times to measure. Wireless device 150 may store a counted NTM parameter value corresponding to the counter. As described below, wireless device 150 may use the counted NTM parameter value as a comparative to the allowed NTM parameter value specified in the inter-frequency parameters.

In block 425, inter-frequency measurements are filtered. For example, wireless device 150 filters inter-frequency measurements based on a number (e.g., one, two, three, etc.) of DRX cycle(s).

Referring to FIG. 4B, in block 430, it is determined whether the cell reselection criteria have been met. Wireless device 150 determines whether signal metrics (e.g., signal power, signal quality, etc.) satisfy certain threshold values pertaining cell reselection. For example, wireless device 150 stores signal threshold values pertaining to cell reselection. Wireless device 150 compares signal values stemming from inter-frequency measurements with the stored signal threshold values. Based on the result of the comparisons, wireless device 150 determines whether the cell reselection criteria have been met.

When it is determined that the cell reselection criteria have been met (block 430—YES), a new cell is selected (block 435). For example, wireless device 150 selects a new cell on which to camp.

In block 440, a time period indicated by the RIR parameter is used. For example, wireless device 150 waits a time period indicated by the RIR parameter before attempting another cell reselection (e.g., proceeding to block 405). Wireless device 150 may also reset the counter pertaining to the NTM parameter. For example, the counter may be reset to zero.

When it is determined that the cell reselection criteria have not been met (block 430—NO), it is determined whether a counted NTM parameter value is less than the allowed NTM value (block 445). For example, wireless device 150 uses the counted NTM parameter value as a comparative to the actual or allowed NTM parameter value specified in the inter-frequency parameters for cell reselection. Based on the comparison, wireless device 150 determines whether the counted NTM parameter value is less than the allowed NTM parameter value When it is determined that the counted NTM parameter value is less than the allowed NTM value (block 445—YES), then process 400 continues to block 410. For example, wireless device 150 continues to perform cell reselection (e.g., proceeding to block 410) and selects one or multiple frequency bands and/or one or multiple frequencies within one or multiple frequency bands to measure.

When it is determined that the counted NTM parameter value is not less than the allowed NTM value (block 445—NO), then the RI parameter is used (block 450). For example, when the counted NTM parameter value is equal to the allowed NTM value, wireless device 150 waits a time period indicated by the RI parameter before attempting another cell reselection (e.g., proceeding to block 405).

Although FIGS. 4A and 4B illustrate an exemplary cell reselection process 400, according to other embodiments, process 400 may include additional operations, fewer operations, and/or different operations than those illustrated in FIGS. 4A and 4B, and as described herein.

The foregoing description of embodiments provides illustration, but is not intended to be exhaustive or to limit the embodiments to the precise form disclosed. Various modifications and changes may be made thereto, and additional embodiments may be implemented, without departing from the broader scope of the invention as set forth in the claims that follow. The specification and drawings are accordingly to be regarded as illustrative rather than restrictive. For example, the inter-frequency parameters may include a "number of frequencies to measure" (NFM) parameter. The NFM parameter indicates a maximum number of frequency bands and/or frequencies the wireless device is to measure within a wake-up cycle. According to an exemplary implementation, the wireless device uses the NFM parameter when selecting a frequency band and/or a frequency from the candidate set of frequency bands and/or frequencies indicated by the RCFS parameter. In this way, the NFM parameter may limit the number of candidate frequency bands and/or candidate frequencies selected. In a manner similar to that of the NTM parameter, the wireless device may count the number of candidate frequency bands and/or candidate frequencies that the wireless device measures. When the counted NFM value is equal to the value of the NFM parameter, the wireless device may stop selecting additional candidate frequency bands and/or candidate frequencies. For example, referring back to block 445 of FIG. 4B, a modification to process 400 may include whether the counted NFM value is less than the NFM value.

According to an exemplary embodiment, wireless device 150 may use the NFM parameter and/or the NTM parameter when performing the cell reselection procedure. For example, when both the NFM parameter and the NTM parameter are used, referring to block 445 of FIG. 4B, both the counted NFM value and the NTM value may be compared such that when both the counted NFM value and the NTM value are below the NFM parameter and the NTM parameter, respectively, the cell reselection procedure may continue to block 410, otherwise, the wireless device enters a rest interval. Additionally, when the inter-frequency parameters are updated, as previously described, the NFM parameter value may be reduced so that the wireless device has a fewer number of frequency bands and/or frequencies to select and measure.

According to an exemplary embodiment, the inter-frequency parameters may include a mixture of parameter values, some of which pertain to each wake-up period, and other parameter values that pertain to a summation of wake-up periods. For example, the NTM parameter may indicate a value pertaining to each wake-up period, while the NFM parameter may pertain to a series of wake-up periods, or vice-versa. According to such an embodiment, rest periods may be triggered when either and/or both of the counted values are reached.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the process illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A method comprising:
   camping, by a device, on a current cell of a wireless network;
   storing, by the device, cell reselection parameters that have values that change in correspondence to a change of remaining battery power of the device;
   selecting, by the device, a first set of at least one of one or more candidate frequency bands or one or more candidate frequencies based on a first parameter of the cell reselection parameters, wherein the first parameter indicates at least one of one or more candidate frequency bands or one or more candidate frequencies from which the device can select for cell reselection;
   performing, by the device, inter-frequency measurement pertaining to the at least one of the one or more candidate frequency bands or the one or more candidate frequencies;
   counting, by the device, a number of inter-frequency measurements performed;
   filtering, by the device, a result of the inter-frequency measurement;
   determining, by the device, whether a cell reselection criteria has been satisfied based on one or more signal threshold values;
   selecting, by the device, a new cell in response to determining that the cell reselection criteria has been met;
   entering, by the device, a rest period, based on a second parameter of the cell reselection parameters, in response to selecting the new cell, wherein the second parameter indicates a duration of the rest period when cell reselection is successful; and
   determining, by the device, whether to select a second set of at least one of one or more candidate frequency bands or one or more candidate frequencies indicated by the first parameter in response to determining that the cell reselection criteria has not been met.

2. The method of claim 1, wherein the determining whether to select the second set comprises:
   comparing, by the device, a third parameter of the cell reselection parameters to a counted number of inter-frequency measurements performed, wherein the third parameter indicates a maximum number of inter-frequency measurements to be performed by the device;
   determining, by the device, whether the counted number of inter-frequency measurements is greater than the maximum number of inter-frequency measurements; and
   entering, by the device, another rest period, based on a fourth parameter of the cell reselection parameters, in response to determining that the counted number of inter-frequency measurements is greater than the third parameter, wherein the fourth parameter indicates a duration of the other rest period when cell reselection is unsuccessful.

3. The method of claim 1, further comprising:
   receiving, by the device and from a network device of the wireless network, an update to one or more values of the cell reselection parameters based on a state of congestion of the wireless network; and
   using, by the device, in response to receiving the update, the one or more values of the cell reselection parameters.

4. The method of claim 1, wherein the selecting the first set further comprises:
   affording, by the device, a priority of selection to one or more of the at least one of the one or more candidate frequency bands or the one or more candidate frequencies based on one or more priority criteria.

5. The method of claim 4, wherein the one or more priority criteria include any of whether a candidate frequency band or a candidate frequency is of a home wireless network associated with the device, whether a candidate frequency band or a candidate frequency was previously used, or whether inter-frequency information is stored on the device pertaining to a candidate frequency band or a candidate frequency, wherein the inter-frequency information includes cell identity and timing information.

6. The method of claim 4, wherein the one or more priority criteria include a transition time to switch from a current frequency band or a current frequency on which the device is camped to a candidate frequency band or a candidate frequency.

7. The method of claim 1, further comprising:
   determining, by the device, that the device is in a low remaining battery power state;

transmitting, by the device, a power preference indicator to a network device of the current cell wherein the power preference indicator indicates that the device is in the low remaining battery power state; and receiving, by the device, an update to one or more values of the cell reselection parameters, in response to the transmitting.

8. The method of claim 1, wherein the cell reselection parameters include a fifth parameter that indicates a maximum number of at least one of frequency bands or frequencies that the device can measure, and wherein the selecting the first set further comprises:

selecting, by the device, the first set of the at least one of the one or more candidate frequency bands or the one or more candidate frequencies based on the first parameter and the fifth parameter.

9. A device comprising:
a communication interface;
a memory, wherein the memory stores instructions; and
a processor, wherein the processor executes the instructions to:
camp on a current cell of a wireless network;
store cell reselection parameters that have values that change in correspondence to a change of remaining battery power of the device;
select a first set of at least one of one or more candidate frequency bands or one or more candidate frequencies based on a first parameter of the cell reselection parameters, wherein the first parameter indicates at least one of one or more candidate frequency bands or one or more candidate frequencies from which the device can select for cell reselection;
perform inter-frequency measurement pertaining to the at least one of the one or more candidate frequency bands or the one or more candidate frequencies;
count a number of inter-frequency measurements performed;
filter a result of the inter-frequency measurement;
determine whether a cell reselection criteria has been satisfied based on one or more signal threshold values;
select a new cell in response to a determination that the cell reselection criteria has been met;
enter a rest period, based on a second parameter of the cell reselection parameters, in response to selecting the new cell, wherein the second parameter indicates a duration of the rest period when cell reselection is successful; and
determine whether to select a second set of at least one of one or more candidate frequency bands or one or more candidate frequencies indicated by the first parameter in response to a determination that the cell reselection criteria has not been met.

10. The device of claim 9, wherein when determining whether to select the second set, the processor further executes the instructions to:
compare a third parameter of the cell reselection parameters to a counted number of inter-frequency measurements performed, wherein the third parameter indicates a maximum number of inter-frequency measurements to be performed by the device;
determine whether the counted number of inter-frequency measurements is greater than the maximum number of inter-frequency measurements; and
enter another rest period, based on a fourth parameter of the cell reselection parameters, in response to a determination that the counted number of inter-frequency measurements is greater than the third parameter, wherein the fourth parameter indicates a duration of the other rest period when cell reselection is unsuccessful.

11. The device of claim 9, wherein the processor further executes the instructions to:
receive, from a network device of the wireless network, an update to one or more values of the cell reselection parameters based on a state of congestion of the wireless network; and
use, in response to receipt of the update, the one or more values of the cell reselection parameters.

12. The device of claim 9, wherein when selecting the first set, the processor further executes the instructions to:
afford a priority of selection to one or more of the at least one of the one or more candidate frequency bands or the one or more candidate frequencies based on one or more priority criteria.

13. The device of claim 12, wherein the one or more priority criteria include any of whether a candidate frequency band or a candidate frequency is of a home wireless network associated with the device, whether a candidate frequency band or a candidate frequency was previously used, or whether inter-frequency information is stored on the device pertaining to a candidate frequency band or a candidate frequency, wherein the inter-frequency information includes cell identity and timing information.

14. The device of claim 12, wherein the one or more priority criteria include a transition time to switch from a current frequency band or a current frequency on which the device is camped to a candidate frequency band or a candidate frequency.

15. The device of claim 9, wherein the processor further executes the instructions to:
determine that the device is in a low remaining battery power state;
transmit, by the communication interface, a power preference indicator to a network device of the current cell, wherein the power preference indicator indicates that the device is in the low remaining battery power state; and
receive, by the communication interface, an update to one or more values of the cell reselection parameters, in response to a transmission of the power preference indicator.

16. A non-transitory storage medium that stores instructions executable by a processor of a device to:
attach and register to a wireless network via a network device of the wireless network;
store cell reselection parameters that have values that change in correspondence to a change of remaining battery power of the device;
select a first set of at least one of one or more candidate frequency bands or one or more candidate frequencies based on a first parameter of the cell reselection parameters, wherein the first parameter indicates at least one of one or more candidate frequency bands or one or more candidate frequencies from which the device can select for cell reselection;
perform inter-frequency measurement pertaining to the at least one of the one or more candidate frequency bands or the one or more candidate frequencies;
count a number of inter-frequency measurements performed;
filter a result of the inter-frequency measurement;
determine whether a cell reselection criteria has been satisfied based on one or more signal threshold values;

select a new cell in response to a determination that the cell reselection criteria has been met;

enter a rest period, based on a second parameter of the cell reselection parameters, in response to selecting the new cell, wherein the second parameter indicates a duration of the rest period when cell reselection is successful; and determine whether to select a second set of at least one of one or more candidate frequency bands or one or more candidate frequencies indicated by the first parameter in response to a determination that the cell reselection criteria has not been met.

17. The non-transitory storage medium of claim 16, wherein the instructions to determine whether to select the second set further comprise instructions executable by the processor of the device to:

compare a third parameter of the cell reselection parameters to a counted number of inter-frequency measurements performed, wherein the third parameter indicates a maximum number of inter-frequency measurements to be performed by the device;

determine whether the counted number of inter-frequency measurements is greater than the maximum number of inter-frequency measurements; and enter another rest period, based on a fourth parameter of the cell reselection parameters, in response to a determination that the counted number of inter-frequency measurements is greater than the second parameter, wherein the fourth parameter indicates a duration of the other rest period when cell reselection is unsuccessful.

18. The non-transitory storage medium of claim 16, further storing instructions executable by the processor of the device to:

receive from the network device the cell reselection parameters, wherein the cell reselection parameters are carried by a non-access stratum message or a system information block message.

19. The non-transitory storage medium of claim 16, further storing instructions executable by the processor of the device to:

receive from the network device an update to one or more values of the cell reselection parameters based on a state of congestion of the wireless network; and use, in response to receipt of the update, the one or more values of the cell reselection parameters.

20. The non-transitory storage medium of claim 16, further storing instructions executable by the processor of the device to:

reset a counted number of inter-frequency measurements performed to zero in response to selecting the new cell.

* * * * *